(No Model.)
F. J. BALL.
VEHICLE WHEEL.
No. 566,556. Patented Aug. 25, 1896.
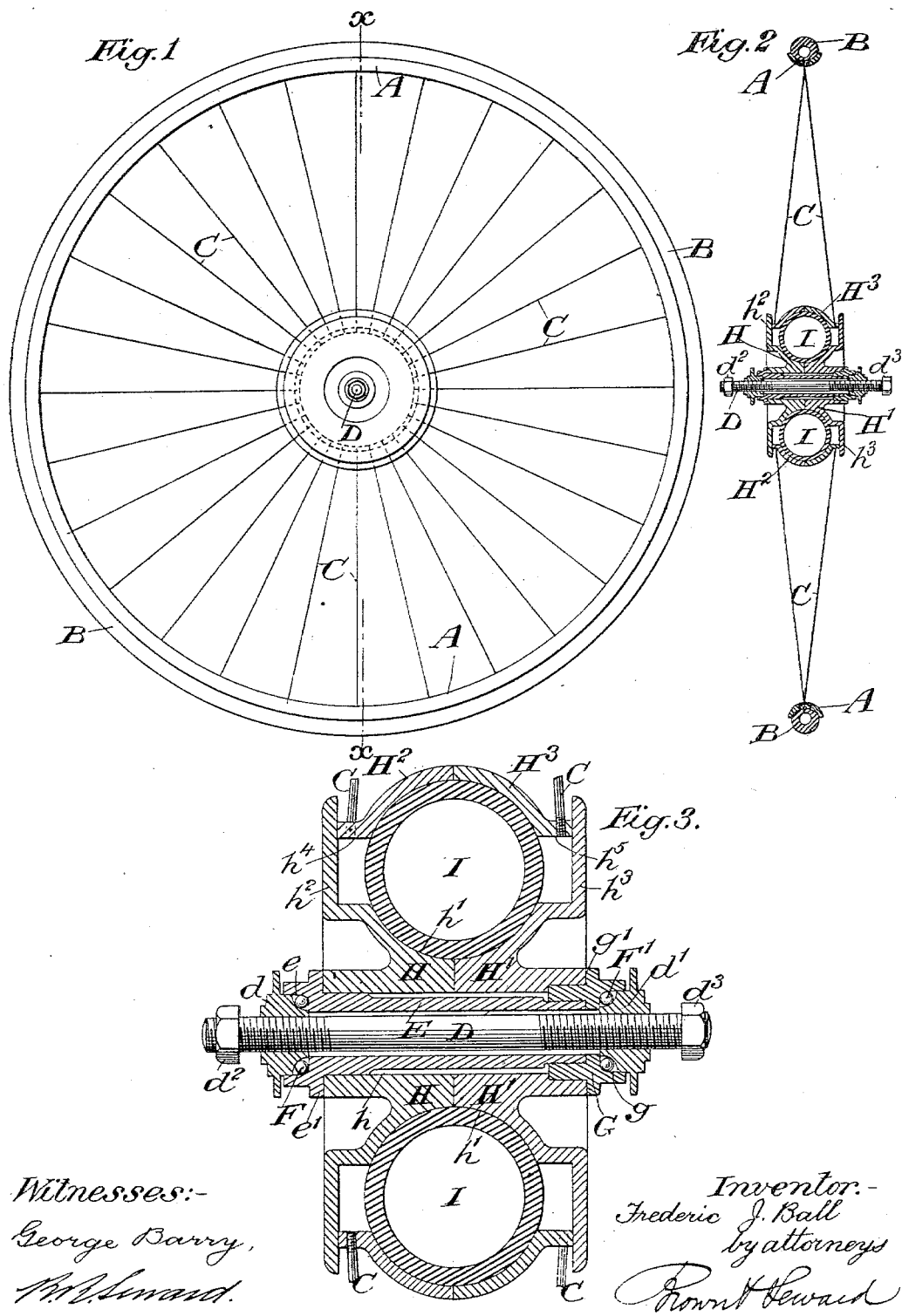
Witnesses:—
George Barry,
P. M. Simard.
Inventor.—
Frederic J. Ball
by attorneys
Rown H Seward

United States Patent Office.

FREDERIC J. BALL, OF BROOKLYN, NEW YORK.

VEHICLE-WHEEL.

SPECIFICATION forming part of Letters Patent No. 566,556, dated August 25, 1896.

Application filed June 28, 1895. Serial No. 554,357. (No model.)

*To all whom it may concern:*

Be it known that I, FREDERIC J. BALL, of Brooklyn, in the county of Kings and State of New York, have invented a new and useful Improvement in Vehicle-Wheels, of which the following is a specification.

My invention relates to an improvement in that class of vehicle-wheels in which a cushion is located between the felly and the axle-box for materially diminishing the vibration of the wheel.

A further object is to provide a wheel of the above class in which the number of parts is reduced to a minimum and in which the parts may be very quickly and easily assembled.

A practical embodiment of my invention is represented in the accompanying drawings, in which—
Figure 1 is a side view of the wheel. Fig. 2 is a transverse central section on the line $x\,x$ of Fig. 1, and Fig. 3 is an enlarged transverse central section of the hub of the wheel.

The felly is designated by A, and it may be made of any of the different shapes and materials to suit tires of different styles, as may be desired. In the accompanying drawings I have shown a felly which is adapted for use in connection with a cushion-tire; but, if desired, the felly may be provided with a solid or pneumatic tire. The tire B, which I have shown in the accompanying drawings, is of the well-known cushion type, which is a tube having very thick walls and a small bore.

The hub of the wheel is connected to the felly A by spokes C. The axle is designated by D, and it is provided with suitable adjusting-cones $d\,d'$ and jam-nuts $d^2\,d^3$ for clamping the axle, in the case of a velocipede, to the supporting-forks thereof.

The axle-box, which surrounds the axle D, is designated by E, and it is provided at one end with a suitable bearing-cup $e$, between which and the cone $d$ is located one set of roller-bearings F. The axle-box E is further provided upon the end in which the bearing-cup $e$ is located with a circumferential flange $e'$, against which one of the hub-sections, to be hereinafter described, abuts. The opposite end of the axle-box E is provided with an exterior screw-thread, which is engaged by an adjusting-sleeve G, which sleeve is provided with a bearing-cup $g$, between which and the cone $d'$ on the axle D is interposed another set of roller-bearings F'. This sleeve G is provided with a circumferential flange $g'$, for the purpose to be hereinafter described. The cones $d$ and $d'$ upon the axle D may be turned to adjust the roller-bearings to the proper degree.

The hub is made in two sections H H', the meeting faces of the two sections being in a plane at right angles to the axis upon which the wheel turns. The hub is provided with a central bore $h$, which is adapted to embrace the axle-box E with an easy sliding fit. The face of the hub-section H opposite that adjacent to the hub-section H' abuts against the circumferential flange $e'$ upon the axle-box G, and the corresponding face of the hub-section H' abuts against the circumferential flange $g'$ upon the sleeve G, so that when the said sleeve G is screwed up upon the axle-box E it will clamp the two sections of the hub securely together.

The exterior of the hub-sections H H' is provided with an annular groove $h'$, in which is seated the cushion I. This cushion I is shown in the accompanying drawings as an air-tube of ring form whose inner circumference fits closely into the annular groove $h'$. This air-tube I may be closed or it may be inflated by a suitable valve, if so desired, the tube shown in the accompanying drawings being a closed air-tube. The hub-sections H H' are provided on their opposite outer faces with outwardly-extended flanges $h^2\,h^3$, respectively, which flanges preferably extend to a point about even with the outer circumference of the cushion I.

Around the outer circumference of the cushion I, I provide two hub-plates $H^2\,H^3$, which conform along their interior wall to the exterior circumference of the said cushion I.
The meeting faces of these hub-plates $H^2\,H^3$ extend along a plane at right angles to the axle D. The outer edge $h^4$ of the hub-plate $H^2$ is extended into engagement with the back of the flange $h^2$ of the hub-section H at a point some distance from the outer circumference of the said hub-section H, and the outer edge $h^5$ of the hub-plate $H^3$ is similarly engaged with the back of the flange $h^3$ of the hub-section H', so that the said hub-sections H H' may be allowed a movement toward and away from the interior circumference of the hub-plates H² H³ by reason of the cushion I, interposed between the said plates and the hub-sections.

The spokes C, hereinabove referred to, extend from the said hub-plates H² H³ to the felly B, so that they are at all times rigidly secured at a certain distance from said felly.

The manner of assembling the several parts of my wheel is as follows: Supposing the axle D to have its cone $d$ secured thereon, the axle-box E is then inserted over the said axle and the roller-bearings interposed between the cone and the cup $e$. The hub-section H is then slid along the axle-box E until its outer face abuts against the flange $e'$. The cushion I and hub-plate H² are then placed in position and then the hub-section H' and hub-plate H³ are slid along the axle-box E until they engage the corresponding sections H H². The clamping-sleeve is then engaged with the exterior screw-threaded portion of the axle-box E and then screwed up, thereby clamping the hub-sections and hub-plates securely together by reason of the engagement of the circumferential flange $g'$ with the outer face of the hub-section H'. The adjusting-cone $d'$ is then screwed up upon the axle D and the roller-bearings F' inserted between the cone $d'$ and the bearing-cup $g$. The spokes C may then be adjusted, when the wheel will be ready for use.

By interposing a cushion between the axle-box and the felly the vibration of the axle of the wheel is reduced to a minimum, thereby rendering the vehicle to which it is attached more comfortable.

When the wheel is applied to a velocipede, the forks are inserted in position exterior to the adjusting-cones $d$ $d'$, and the jam-nuts $d^2$ $d^3$ are then screwed home, thereby securing the wheel to the said forks.

It is evident that slight changes might be resorted to in the form and arrangement of the several parts without departing from the spirit and scope of my invention. Hence I do not wish to limit myself strictly to the structure herein set forth; but

What I claim is—

1. In combination, a felly, a tire thereon, an axle and an axle-box therefor, a hub comprising two sections engaging the axle-box having laterally-extended flanges on their outer faces and two hub-plates spaced from the exterior walls of the hub-sections held together by the said flanges, an air-cushion interposed between the said hub-sections and hub-plates, means for securing the several parts in their assembled adjustment upon the axle-box and spokes connecting the hub-plates with the felly, substantially as set forth.

2. In combination, an axle, an axle-box therefor having a circumferential flange at one end, a hub composed of two hub-sections fitted to the exterior of the axle-box, said hub-sections having laterally-extended flanges on their faces and two hub-plates spaced from the exterior walls of the hub-sections and held together by said flanges, a felly, a tire thereon, spokes connecting the felly with the hub-plates an air-cushion interposed between the hub-sections and hub-plates, and a clamping-sleeve having a screw-threaded engagement with one end of the axle-box, said sleeve having a circumferential flange for engaging the opposite face of the hub to that engaged by the flange on the axle-box for locking the several parts in their assembled adjustment, substantially as set forth.

FREDERIC J. BALL.

Witnesses:
GEO. A. GOODENOUGH,
GEO. W. KIRK.